July 31, 1962 H. S. KAWECKI 3,046,841
REMOTELY CONTROLLED MIRROR
Filed Aug. 19, 1959 3 Sheets-Sheet 1

INVENTOR.
Henry S. Kawecki
BY
G. E. McGlynn Jr.
ATTORNEY

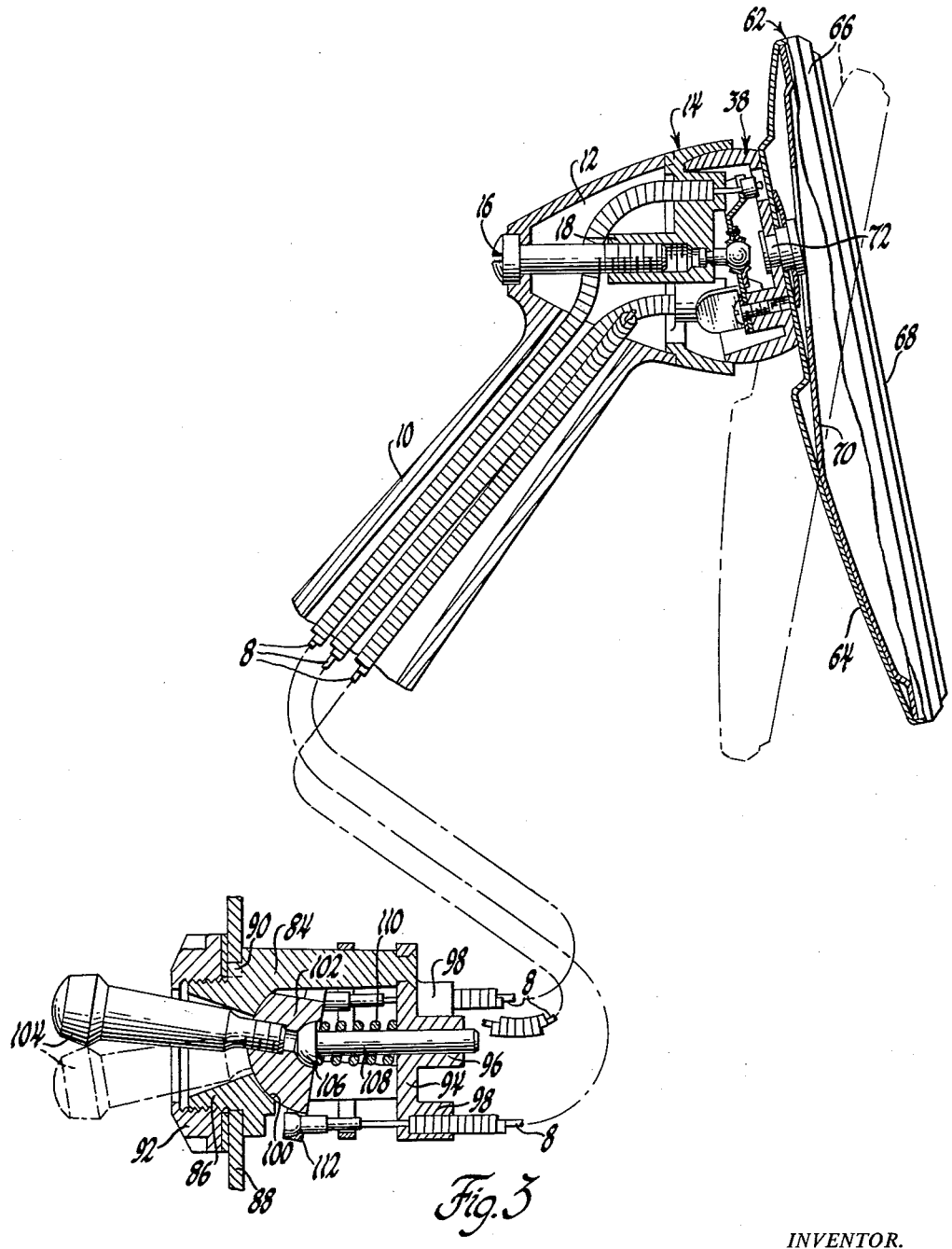

July 31, 1962     H. S. KAWECKI     3,046,841
REMOTELY CONTROLLED MIRROR
Filed Aug. 19, 1959     3 Sheets-Sheet 3
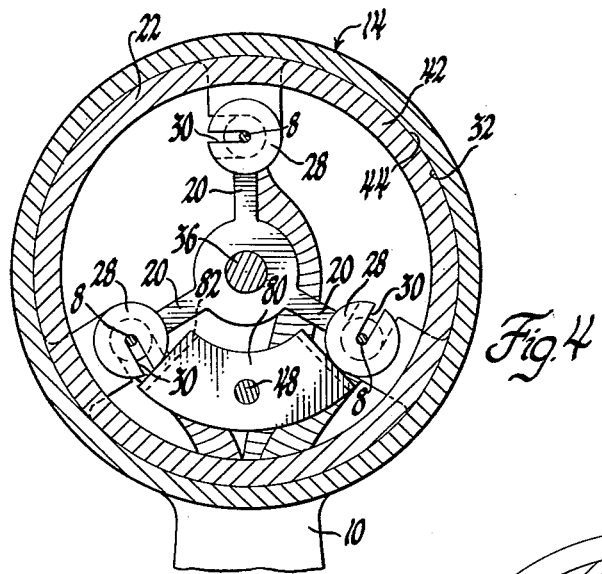
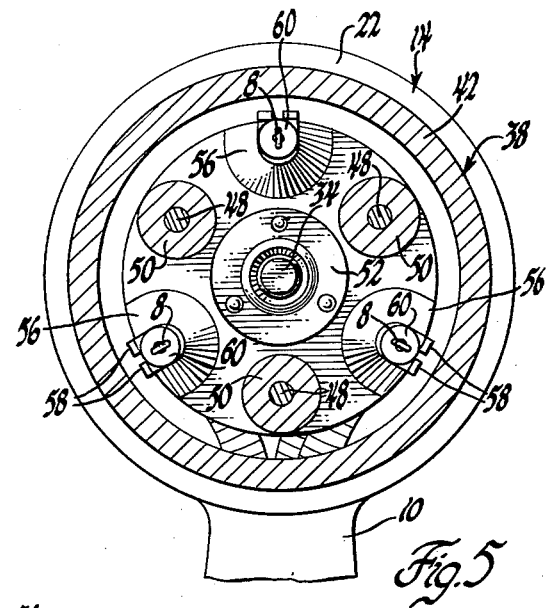
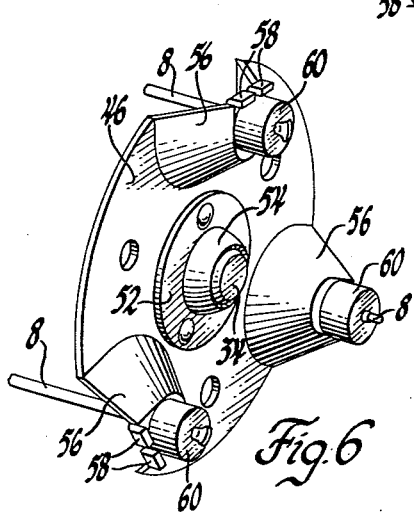
INVENTOR.
Henry S. Kawecki
BY
G. E. McGlynn Jr.
ATTORNEY been# United States Patent Office 3,046,841
Patented July 31, 1962

3,046,841
REMOTELY CONTROLLED MIRROR
Henry S. Kawecki, Birmingham, Mich., assignor to General Motors Corporation, Detroit, Mich., a corporation of Delaware
Filed Aug. 19, 1959, Ser. No. 834,845
4 Claims. (Cl. 88—98)

This invention pertains to a remotely controlled mirror mechanism in which the remotely actuable mirror assembly may be adjusted by means completely independent of the remote actuating means thereby providing a greater range of mirror adjustment and, in particular, to such a remotely controlled mirror mechanism of the cable-operated type.

Remotely controlled mirror mechanism of the type to which reference is herein made typically comprise a mirror assembly adapted to be actuated or adjusted by a remotely located actuator member. With reference to the use of such a mechanism on an automotive vehicle, the mirror assembly is mounted exteriorly of the vehicle passenger compartment, such as on a door or fender thereof, while the actuator member is mounted within the interior of the vehicle such as on a door or on or below the instrument panel or dashboard of the vehicle. The actuator member and the mirror assembly may be operatively connected to accomplish mirror adjustment in response to operation of the actuator member in several well known manners including a direct mechanical connection, a fluid system or flexible operating cables of the Bowden wire type. In such prior mechanisms of this type, the range of mirror adjustment has been limited to the use of the operating means connecting the mirror assembly to the remotely located actuator. This problem is particularly apparent with respect to cable-operated mirrors in which any attempt to adjust the mirror assembly independently of operation of the cables may result in twisting and fouling of the operating cables.

It is, therefore, a principal object and feature of this invention to provide an improved remotely controlled mirror mechanism of the type aforementioned in which the mirror assembly may be adjusted by means completely independent of the primary remotely controlled operating means without disabling the action of the latter.

It is yet another object and feature of this invention to provide a remotely controlled mirror mechanism of the cable-operated type comprising operating cables having the opposite ends thereof respectively directly connected to a mirror support and a remotely located actuator, and in which the mirror assembly is adjustable pivotally mounted to the mirror support about a fixed axis for manual adjustment independently of operation of the cables.

In general, these and other objects of this invention are attained in a remotely controlled mirror mechanism comprising a mounting bracket, a mirror support universally adjustably pivotally mounted on the mounting bracket, a mirror assembly having an eccentric point thereon pivotally connected to said mirror support for rotation about a fixed axis relative to and independent of adjustment of the mirror support, an actuator located remotely from the aforementioned mounting bracket, and a plurality of flexible cables having the opposite ends thereof respectively directly connected to the aforementioned mirror support and actuator. The aforedescribed structure permits the mirror support, and hence the mirror assembly, to be universally pivotally adjusted to and retained in a selected position by means of the operating cables upon adjustment of the actuator, while the mirror may be manually rotated about its pivotal connection to the mirror support to provide a greater range of mirror adjustment independently of movement of the mirror support and without twisting, fouling or otherwise disabling the action of the operating cables.

The structure and function of the aforementioned mirror mechanism will become more apparent hereinafter as the description of the invention proceeds, and in which reference is made to the following drawings in which:

FIGURE 3 is a sectional view of the exteriorly mounted mirror structure and remotely located actuator, and shows the operative relationship of these parts;

FIGURE 4 is a section taken on line 4—4 of FIGURE 2;

FIGURE 5 is a section taken on line 5—5 of FIGURE 2; and,

FIGURE 6 is a perspective view showing the details of the cable connector associated with the mirror support head.

Figure 1:
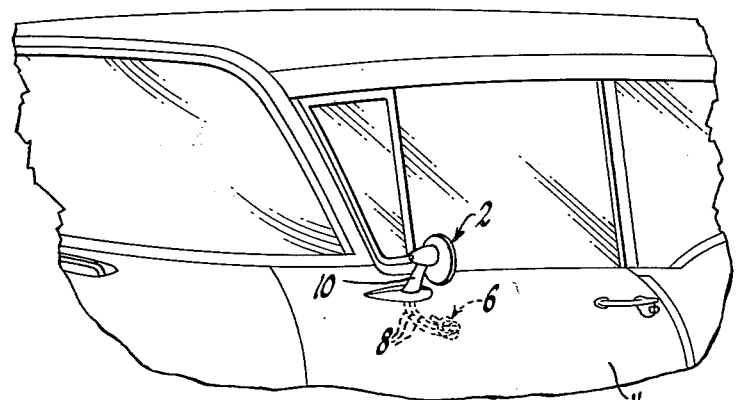
FIGURE 1 is a fragmentary perspective view of an automotive passenger vehicle equipped with the remotely controlled mirror mechanism of this invention.

The drawings, and particularly FIGURE 1 thereof, show one illustrative embodiment of the invention in which the mirror structure 2 is located on the door 4 of an automotive vehicle exteriorly of the passenger compartment, and is adapted to be remotely positioned by the actuator 6 mounted on the inside panel of the door 4. The mirror structure 2 and actuator 6 are operatively connected by means of three flexible operating cables or Bowden wires 8 comprising the usual wire or cable enclosed within a sheathing. At this juncture, and as will become readily apparent as the description proceeds, the mirror structure 2 may be mounted exteriorly of the vehicle in positions other than on the door 4, such as on a front fender of the vehicle, while the actuator 6 may be located in other positions within the vehicle passenger compartment such as on or below the instrument panel or dashboard thereof.

The mirror structure 2 comprises a mounting bracket 10 having its lower end suitably secured to the exterior panel of the vehicle door 4. In passing, it may be noted that the lower end of the mounting bracket may be adjustably mounted on the door by utilizing a ball and socket connection or any other equivalent means as is well known in the art. At its upper or outer end, the bracket includes an open-ended housing 12 in which an adapter member 14 is secured by means of the stud or other suitable fastener 16 which extends through the rear of the housing 12 and is threadably received within an axially rearwardly extending threaded boss 18 centrally located on the adapter.

Figure 2:
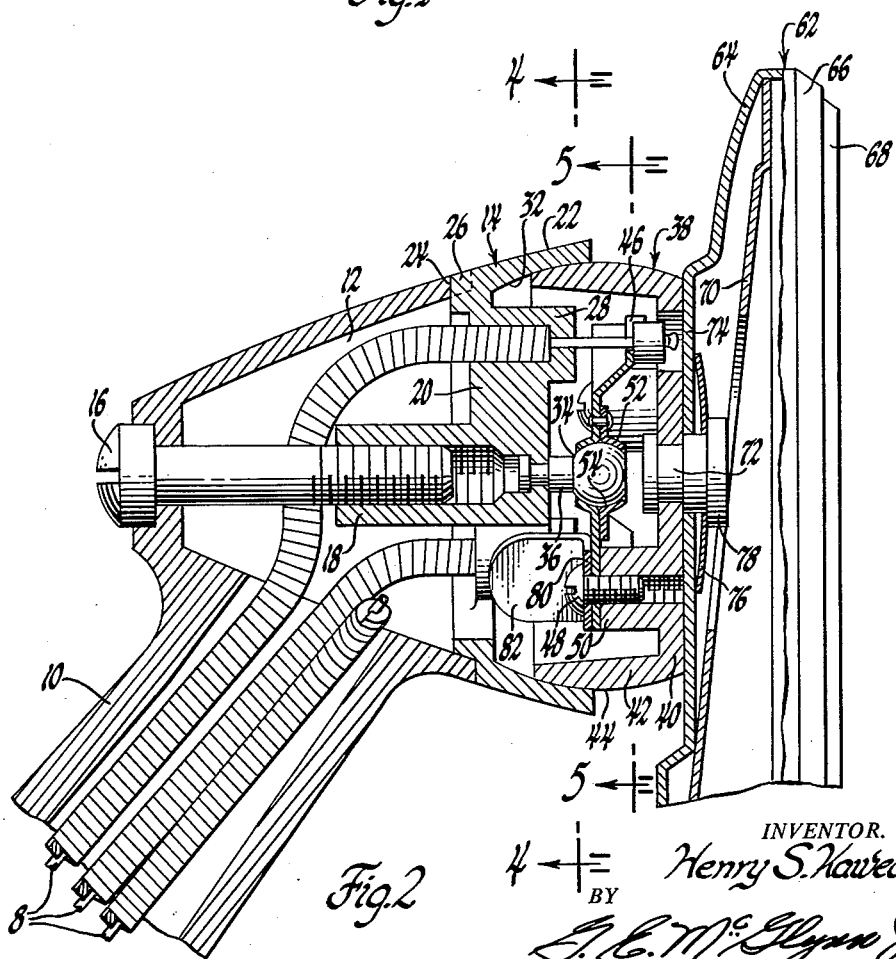
FIGURE 2 is an enlarged fragmentary vertical sectional view of the exteriorly mounted mirror structure of FIGURE 1.

Referring particularly to FIGURES 2 and 4, the adapter 14 further comprises three equidistantly spaced radially projecting spokes or arms 20 terminating in an outer annular skirt 22 having an annular shoulder 24 adapted to be seated against the forward edge of the housing 12, it being noted particularly in FIGURE 2 that the skirt 22 includes a locating notch into which a suitable locating projection on the housing may fit as indicated at 26 to locate the adapter properly on the housing. An axially forwardly extending boss 28 is formed intermediate the ends of each of the respective spokes or arms 20, and each includes a radial slot 30 throughout its length. The annular inner surface of the adapter skirt 22 defines a spherical bearing surface 32, while a spherical ball member 34 is carried on the forward end of a stud 36 suitably fixedly secured centrally of the adapter member 14. The purpose of the bearing surface 32 and ball member 34 will become apparent from a consideration of the details of the mirror support member 38.

With reference primarily to FIGURES 2, 5 and 6, the mirror support member 38 comprises an annular forward wall portion 40 joined to a rearwardly extending annular skirt 42 having an external bearing surface 44 of spherical configuration adapted to be nested against or within the bearing surface 32 on the adapter skirt 22. A cable connector and support member 46, the details of which are shown in FIGURE 6, takes the form of a substantially annular disc having three spaced apertures adjacent the periphery thereof to receive the fasteners 48 for securing the member 46 to the bosses 50 axially rearwardly projecting from the wall 40 of the mirror support. A plate 52 is riveted or otherwise suitably secured to the center portion of the connector member 46, and together are shaped so as to form a spherical socket 54 universally adjustably supported on the ball member 34. The three spaced axial projections 56 equidistantly located about the periphery of the connector member 46 are each slotted radially and include axially forwardly extending locking tangs 58 on either side of each slot to form a seat for plugs 60 on the ends of each of the operating cables 8.

The mirror assembly 62 itself is of conventional construction and, as such, comprises an annular metal body 64 having an inturned flange 66 against which the mirror element 68 is seated, while the backing member 70 in the form of a spring plate or spring fingers acts between the body 64 and rear surface of the mirror element 68 to maintain the latter in place. A pivot pin 72 is mounted and retained centrally of the mirror support wall 40 and the wall portion 74 of the mirror assembly body 64, which is eccentrically located with respect to the geometrical axis of the mirror element 68, normally lies flush against the support wall 40 and is rotatably supported upon the pivot pin. A spring washer 76 acts between the mirror body 74 and a shoulder 78 at the outer end of the pin 72 to normally urge the mirror body into engagement with the mirror support wall 40.

A stop member 80 is rigidly secured to one of the projections 50 on the mirror support 38, and includes at its opposite ends an axially rearwardly projecting stop tab 82. As will be clear from a consideration of FIGURE 4, the stop tabs are closely confined between an adjacent pair of the arms or spokes 20 thereby preventing rotation of the mirror support 38 about an axis through the ball member 34 coincident with the fixed axis of the pivot pin 72.

It will be readily appreciated from the drawings that each of the flexible cables 8 including their associated sheathing are suitably nested or seated within the bores of the projections 28 on the adapter 14 with the respective bared wires being passed through the radial slots 30 in these projections and through the slots in the projections 56 on the cable connector 46. The tangs 58 prevent the plugs 60 from sliding radially outwardly from their seats.

The actuator assembly may be seen in FIGURE 3 to comprise a housing or body 84 generally of tubular configuration, and joined to a threaded bushing 86 of reduced diameter extending through a suitable aperture within the support panel 88. It will be noted that the juncture of the housing and bushing of the actuator is suitably notched to receive a locating key on the panel 88 as indicated at 90. The housing is retained upon the panel by means of a threaded nut 92 received on the bushing 86 in abutting engagement with the panel. The base of the housing 84 is closed by a plate 94 including a central axially projecting boss 96 having an opening therethrough and three substantially equidistantly spaced bosses 98 having recesses therein for receiving the sheathed ends of the operating cables 8. An annular spherical bearing or socket surface 100 is formed interiorly of the housing 84, and is adapted to receive the spherical ball member 102 to which the operating handle 104 is threadably secured and extends through an opening in the bushing 86 and nut 92 so as to be externally accessible. The opposite face of the ball member 102 includes a spherical depression in which the spherical head 106 of the pin 108 seats, the pin being slidably disposed within the bushing 96 and biased into engagement with the ball member 102 by means of a coiled spring 110. Fittings are provided for the ends of the bared wire of each of the operating cables 8, and are suitably seated within radial projections 112 formed integral with the ball member 102.

For the most part, the assembly of the remote control mechanism of this invention will be apparent from the foregoing description. However, it should be noted that the secondary ball and socket connection comprising the locating means for the actuator as indicated at 90 and for the adapter member 14 as indicated at 26 serve to properly orient the assembly to insure that movement of the actuator operating handle 104 in a given direction will result in a corresponding and desired mirror adjustment. Moreover, it will be appreciated that the spring biased pin 108 is intended primarily to maintain the ball member 102 securely within its socket 100. However, depending upon the relative spacing of the mirror structure from the actuator assembly for any given vehicle, the spring 110 may function as a device for imposing tension on the cables 8 thereby removing any slack which may appear therein.

In operation, the mirror assembly 62 may be adjusted to and retained in any selected position by universally swivelly adjusting the actuater ball member 102 within its socket. Thus, and referring to FIGURE 3, the actuator handle 104 may be grasped and moved from the full line to the dotted line position thereby resulting in pivotal adjustment of the mirror assembly 62 from the full line to the dotted line position. In making this adjustment, the mirror support 38 is universally pivotally supported about the primary ball and socket connection composed of the ball member 34 and socket 54, while the mating bearing surfaces 32 and 44 of the adapter and mirror support skirts respectively provide additional support for the mirror support head. The pivot pin 72, being connected eccentrically to the mirror body 64, provides an additional range of adjustment for the mirror assembly to supplement the adjustment afforded by the cable operated mechanism. Thus, the vehicle operator may grasp the mirror body 64 and manually rotate it about the fixed axis of the pin 72, the spring washer 76 permitting the mirror assembly to be moved axially away from the mirror support wall 40 during this adjustment. After the adjustment is made, the spring washer firmly biases the mirror body 64 into sufficient frictional engagement with the mirror support wall 40 to retain the mirror in its selected position. During this manual adjustment about the axis of the pin 72, the stop tabs 82 prevent the mirror support 38 from rotating about the fixed axis of the pin 72 thereby avoiding any problem of the cables 8 becoming twisted, fouled or otherwise disabled for cable adjustment of the mirror. Moreover, apart from the secondary manual adjustment of the mirror assembly, it will be readily apparent that these stop projections insure proper orientation of the mirror support 38 relative to the adapter member 14 during repeated operation of the mechanism.

While but one form of the invention has been selected for a descriptive illustration thereof, other forms will be apparent to those skilled in the art. Therefore, the embodiment shown in the drawings is merely for illustrative purposes, and is not intended to limit the scope of the invention which is defined by the claims which follow.

I claim:

1. A remotely controlled mirror mechanism comprising a mounting bracket, a mirror support, a ball and socket connection universally pivotally mounting said mirror support on said bracket, a mirror assembly, a pivot pin mounting said mirror assembly on said mirror support for rotation about a fixed axis relative to the latter, cooperating stop means on said mounting bracket and mirror support to prevent rotation of the latter in response to pivotal adjustment of said mirror assembly about said fixed axis, an adjustable actuator located remotely from said mirror support, and a plurality of operating cables having the opposite ends thereof respectively connected at spaced points to said mirror support and actuator.

2. A remotely controlled mirror mechanism comprising a mounting bracket, an annular spherical bearing surface on said mounting bracket, a ball member fixed to said mounting bracket centrally of said bearing surface, a mirror support, an annular spherical bearing surface on said mirror support seated on said bracket bearing surface, a socket member secured to said mirror support centrally of the bearing surface on the latter and universally pivotally supporting said mirror support on said ball member, a mirror assembly, a pivot pin connected eccentrically to said mirror assembly and pivotally supporting the latter on a fixed axis relative to said mirror support, cooperating stop means on said mounting bracket and mirror support to prevent rotation of the latter in response to pivotal adjustment of said mirror assembly about said axis, an actuator housing including a support socket, a manually operable actuator member universally mounted in said actuator socket, and a plurality of operating cables having the opposite ends thereof respectively connected at spaced points to said mirror support and actuator member.

3. A remotely controlled mirror mechanism comprising a mounting bracket, an internal annular spherical bearing surface on said bracket, a ball member fixed to said bracket centrally of said bearing surface, a mirror support, an external annular spherical bearing surface on said support seated in said bracket bearing surface, a socket member secured to said mirror support centrally of the bearing surface on the latter and universally pivotally supporting said mirror support on said ball member, a mirror assembly, a pivot pin connected eccentrically to said mirror assembly and pivotally supporting the latter on a fixed axis relative to said mirror support, cooperating stop means on said bracket and mirror support to prevent rotation of the latter in response to pivotal adjustment of said mirror assembly about said axis, an actuator housing including a support socket, a manually operable actuator member universally mounted in said actuator socket, and a plurality of operating cables having the opposite ends thereof respectively connected at spaced points to said mirror support and actuator member.

4. A remotely controlled mirror mechanism comprising a mounting bracket, a mirror support, first and second ball and socket connections having a common pivot center universally pivotally mounting said mirror support on said bracket, a mirror assembly, a pivot pin mounting said mirror assembly on said mirror support on an axis substantially parallel to the first and second ball and socket connections for rotation of the mirror assembly about said axis relative to the mirror support, cooperating stop means on said mounting bracket and mirror support, an adjustable actuator located remotely from said mirror support and a plurality of operating cables having the opposite ends thereof respectively connected at spaced points to the mirror support and actuator, said stop means preventing rotation of the mirror support about its axis in response to pivotal adjustment of the mirror assembly about the axis of the pivot pin so that said cables are not twisted during said mirror assembly adjustment.

References Cited in the file of this patent
UNITED STATES PATENTS

| | | |
|---|---|---|
| 1,570,888 | Gray | Jan. 26, 1926 |
| 1,863,060 | Knutson | June 14, 1932 |
| 2,500,784 | Anderson | Mar. 14, 1950 |
| 2,623,986 | Falge | Dec. 30, 1952 |
| 2,713,810 | Hill | July 26, 1955 |
| 2,931,245 | Jacobson | Apr. 5, 1960 |